US008335794B1

(12) United States Patent
Goodson et al.

(10) Patent No.: US 8,335,794 B1
(45) Date of Patent: Dec. 18, 2012

(54) OPTIMIZING PERFORMANCE OF DATABASE MIDDLEWARE

(75) Inventors: John Goodson, Morrisville, NC (US); Rob Steward, Winston-Salem, NC (US); Mark Biamonte, Apex, NC (US); Cheryl Conrad, Pittsboro, NC (US)

(73) Assignee: Progress Software Corporation, Bedford, MA (US)

( * ) Notice: Subject to any disclaimer, the term of this patent is extended or adjusted under 35 U.S.C. 154(b) by 496 days.

(21) Appl. No.: 11/290,678

(22) Filed: Nov. 29, 2005

Related U.S. Application Data

(60) Provisional application No. 60/676,520, filed on Apr. 28, 2005.

(51) Int. Cl.
*G06F 7/00* (2006.01)
*G06F 17/30* (2006.01)
(52) U.S. Cl. .................................. 707/759; 707/769
(58) Field of Classification Search .................. None
See application file for complete search history.

(56) References Cited

U.S. PATENT DOCUMENTS

| | | | | |
|---|---|---|---|---|
| 5,588,150 | A * | 12/1996 | Lin et al. ........................... | 707/1 |
| 5,881,268 | A * | 3/1999 | McDonald et al. .............. | 703/21 |
| 2002/0026441 | A1* | 2/2002 | Kutay et al. ....................... | 707/5 |
| 2003/0140333 | A1* | 7/2003 | Odaka et al. .................. | 717/115 |
| 2004/0117359 | A1* | 6/2004 | Snodgrass et al. ................ | 707/3 |
| 2004/0210884 | A1* | 10/2004 | Raghavachari et al. ....... | 717/158 |
| 2005/0149537 | A1* | 7/2005 | Balin et al. .................... | 707/100 |

OTHER PUBLICATIONS

DataDirect Performance Tuning Wizard, DataDirect Technologies, [online] [Retrieved on Mar. 8, 2006] Retrieved from the Internet<URL: http://www.datadirect.com/developer/performance_tuning_wizard/index.ssp>, 2 pages.
DataDirect Connect for JDBC Performance Wizard, DataDirect Technologies Corp., 2005, [online] [Retrieved on Mar. 8, 2006] Retrieved from the Internet<URL: http://media.datadirect.com/download/files/perfwizards/connect_jdbc/index.html>, 1 page.
DataDirect Connect for the ODBC Performance Wizard, DataDirect Technologies Corp., 2005, [online] [Retrieved on Mar. 8, 2006] Retrieved from the Internet<URL: http://media.datadirect.com/download/files/perfwizards/connect_odbc/index.html>, 1 page.

(Continued)

*Primary Examiner* — Khanh Pham
*Assistant Examiner* — Azam Cheema
(74) *Attorney, Agent, or Firm* — Patent Law Works LLP

(57) ABSTRACT

One embodiment of the present invention is a wizard (e.g., software) for configuring database access middleware for optimal performance. The wizard asks a set of questions. The questions are presented to the user with a navigable UI, and are designed such that the user does not need database expertise to answer them. Based on the user's answers, the wizard generates a set of connect options and values to be used to optimize performance of the user's middleware. Users can use the wizard to determine whether currently selected options or values of a deployed application are optimal, and to determine if other options/values should be used that may improve the performance of the existing application. Also, a prospective customer that is evaluating middleware can use this wizard to tune the middleware for the intended application, thereby allowing that user to better assess how the middleware will perform.

26 Claims, 9 Drawing Sheets

OTHER PUBLICATIONS

DataDirect Connect® for.NET Performance Wizard, DataDirect Technologies Corp., 2005, [online] [Retrieved on Mar. 8, 2006] Retrieved from the Internet<URL: http://media.datadirect.com/download/files/perfwizards/connect_net/index.html>, 1 page.

DataDirect Connect for ODBC and DataDirect Connect64 for ODBC Performance Wizard, DataDirect Technologies Corp., 2005, [online] [Retrieved on Mar. 8, 2006] Retrieved from the Internet<URL: http://media.datadirect.com/download/files/perfwizards/odbc64/index.html>, 1 page.

JavaOne 2006 News: DataDirect Connect for JDBC Updated, JDJ News Desk, Jun. 28, 2005, [online] [Retrieved on Mar. 8, 2006] Retrieved from the Internet<URL: http://java.sys-con.com/read/105093.htm>, 5 pages.

* cited by examiner

OPTIMIZING PERFORMANCE OF DATABASE MIDDLEWARE

RELATED APPLICATIONS

This application claims the benefit of U.S. Provisional Application No. 60/676,520, filed Apr. 28, 2005, which is herein incorporated in its entirety by reference.

FIELD OF THE INVENTION

The invention relates to the field of database access, and more particularly, to techniques for configuring database access middleware for optimal performance.

BACKGROUND OF THE INVENTION

In today's software environment, a large and increasing number of applications rely on databases to store and retrieve information. These applications typically use a software component that operatively connects the application to the database allowing the application to store and retrieve the data it needs. Since this software component is coupled between the application and the database, it is commonly referred to as middleware. In the field of database access, this middleware component can be called a database driver or database provider, depending on the programming environment for which the middleware is designed.

When developing database drivers or providers, there are often cases where the developer must choose between providing certain functionality at the expense of performance, or vice versa. However, the set of goals, constraints and operations performed by database applications and the environment in which those applications operate are usually different for each of the applications. As such, trading off performance for functionality may be the correct choice for some applications and not for others. To help resolve this inconsistency, database drivers and providers typically provide a set of options that allow the user to choose whether a particular tradeoff is appropriate for their application, in affect customizing the driver or provider to that application.

The problem is that even the simplest of drivers or providers have many options that the user may configure, and in some cases two or more of the options are related such that the setting of one affects how the other option(s) should be set. The user often times is not a database expert and typically is not aware of all of the options available for a given driver or provider. Even when the user does know about all of the options, determining what the best value for each option is for their particular application is time consuming and not trivial.

What is needed are techniques for configuring database access middleware for optimal performance.

SUMMARY OF THE INVENTION

One embodiment of the present invention provides a method using a graphical user interface (GUI) for tuning database access middleware for optimal performance in an application. The method includes querying a user for a type of driver/provider to be tuned, and querying the user regarding functionality of the application (e.g., Does your application execute SQL statements?). The method continues with generating a set of connection options and values to optimize performance of the driver/provider based on the user's responses to queries. The method continues with providing the set of connection options and values to the user. Providing the set of connection options and values to the user may include, for example, at least one of displaying the set of connection options and values, and saving the set of connection options and values into a file. Providing the set of connection options and values to the user may include, for example, providing multiple output formats from which the user can choose (e.g., formats for Windows, UNIX, and Linux users). The method may include querying the user regarding user preferences associated with application performance (e.g., Do you want to see possible syntax errors when preparing SQL statements?). The method may include querying the user regarding personal knowledge of database systems (e.g., Do you understand DB2 system catalogs?). In one particular embodiment, the method is implemented as an applet (e.g., Java) executing in a browser, while other embodiments may implement the method using a scripting language (e.g., JavaScript) or an independent program. Connectivity types supported by the GUI may include, for example, at least one of ODBC, JDBC, and/or .NET. Driver/provider types supported by the GUI may include, for example, at least one of DB2 Wire Protocol, Informix Wire Protocol, Microsoft SQL Server, Oracle Wire Protocol, Sybase Wire Protocol, and Oracle (client-based). Note, however, that embodiments of the present invention can be used with any connectivity type, and with any driver/provider type, and with any database, as will be appreciated in light of this disclosure. The method may include indicating progress of the tuning process. The method may include providing details that indicate an applicable connection string attribute or property based on a question being asked, and guidance on how to set that attribute/property.

Another embodiment of the present invention provides a machine-readable medium (e.g., compact disk, diskette, server, memory stick, or hard drive) encoded with instructions, that when executed by a processor, cause the processor to carry out a process that uses a graphical user interface (GUI) for tuning database access middleware for optimal performance in an application. This process can be, for example, similar to or a variation of the previously described method.

Another embodiment of the present invention provides a graphical user interface (GUI) system for tuning database access middleware for optimal performance in an application. The GUI system includes a driver/provider selection screen for querying a user for a type of driver/provider to be tuned, and a plurality of navigable application question screens, each querying the user regarding functionality of the application. The GUI system further includes a module for generating a set of connection options and values to optimize performance of the driver/provider based on the user's responses to queries, and a results screen for providing the set of connection options and values to the user. The GUI system may be configured to allow the user to save the set of connection options and values into a file. The GUI system may include one or more user preference question screens, each querying the user regarding user preferences associated with application performance. The GUI system may include one or more preference question screens, each querying the user regarding personal knowledge of database systems. The GUI system may be implemented, for example, as an applet configured to execute in a browser. One or more of the GUI screens may indicate progress of the tuning process. One or more of the GUI screens may provide details that indicate an applicable connection string attribute or property based on a question being asked, and guidance on how to set that attribute/property. The results screen for providing the set of connection options and values to the user may allow the user to choose from multiple output formats. In one particular embodiment, the GUI system is implemented as a software wizard, although other implementations will be apparent in light of this disclosure. The system functionality can be implemented, for example, in software (e.g., executable instructions encoded on one or more computer-readable mediums), hardware (e.g., gate level logic), firmware (e.g., one or more microcontrollers with embedded routines), or some combination thereof, or other suitable means.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figures 1A, 1B:
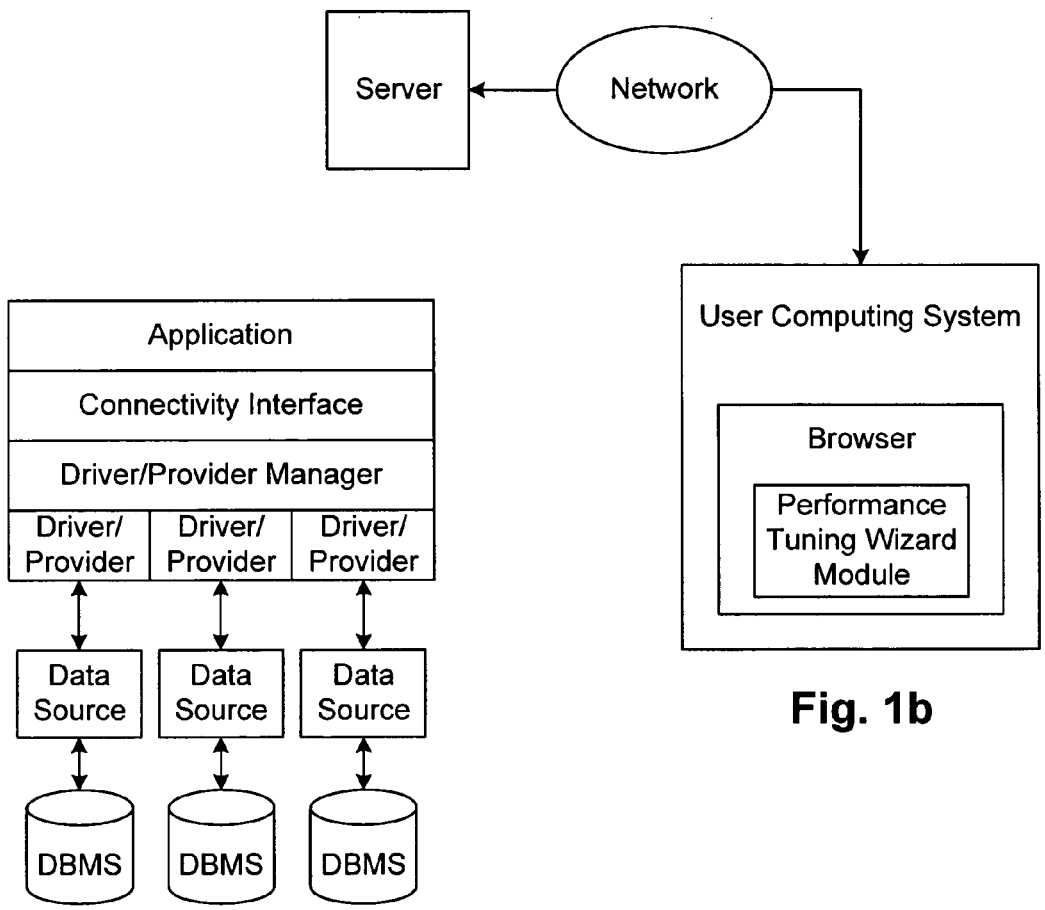
FIG. 1a is a block diagram of a typical database access system.
FIG. 1b is a block diagram of a user computing system configured with a software wizard module for tuning database access middleware for optimal performance, in accordance with one embodiment of the present invention.

Techniques for optimizing the performance of database middleware are disclosed. The techniques can be implemented for any type of database drivers and providers, such as ODBC drivers (open database connectivity), JDBC drivers (Java database connectivity), and .NET providers.

General Overview

In one particular embodiment of the present invention, the techniques are implemented as a software wizard or similar intuitive tool for configuring database access middleware for optimal performance. The wizard, which can run as an applet within a browser window, allows the user to quickly tune the database drivers and providers for a given application by asking a set of questions. The questions are presented to the user with a navigable user interface (UI). The questions are designed such that the user does not need to be a database expert to answer them. Based on the user's answers to these questions, the performance tuning wizard generates a set of connect options and values that can be used to maximize the performance of the database driver/provider in the user's application. The connection options and values can be represented, for example, as a connection string, connection URL, calls to datasource methods, values for odbc.ini, and instructions for setting through ODBC Administrator on Windows. Other such connection options and values will be apparent in light of this disclosure, and the present invention is not intended to be limited to any particular set or sub-set of connection options and values.

Users that have already deployed a database application often times attempt to tune the database drivers or providers for their application. However, if a user is unaware of particular features of the database driver or provider, then the optimal set of connect option values may not be configured. The user can use a performance tuning wizard configured in accordance with an embodiment of the present invention to determine whether the currently selected options or values of the deployed application are optimal, and to determine if other options/values should be used that may improve the performance of the existing application.

Also, a prospective customer that is evaluating a database driver/provider for purchase typically will not take the time to tune the driver/provider, and instead use the default configuration for the driver/provider. While the ideal situation would be for the default settings to provide the best performance, this is not always possible due to differences in application behavior and numerous other factors. Thus, the customer evaluating the driver/provider does not always get a good assessment of how the database driver/provider will perform in their particular application. A performance tuning wizard configured in accordance with an embodiment of the present invention is a relatively easy-to-use tool that takes only a short time to run (e.g., 30 seconds to 10 minutes, depending on options chosen). Given the ease of use of the wizard, a customer evaluating a driver/provider can use this wizard to tune the driver/provider for the intended application, thereby allowing that user to better assess how the driver/provider will perform with that application.

Typical Operating Environment

FIG. 1a is a block diagram of a typical database access system. As can be seen, the database access system includes an application, a connectivity interface, a driver/provider manager, a number of driver/providers, and a number of data sources with their corresponding database management systems (DBMS). The connectivity scheme by which the application communicates with the various data sources can be, for example, ODBC, JDBC, or .NET.

During operation of the database access system, the application processes and calls connectivity functions (e.g., ODBC, JDBC, or .NET functions) to submit SQL statements (or commands/statements written in other suitable database access language) and retrieve results. The connectivity interface (e.g., ODBC, JDBC, or .NET connectivity interface) allows applications to access data in the DBMSs using a suitable database access language (e.g., SQL) for accessing the data. The driver/provider manager loads drivers for the application. Each driver/provider processes connectivity function calls (e.g., ODBC, JDBC, or .NET function calls), submits access requests (e.g., SQL requests) to a specific data source, and returns results to the application. Each data source includes the data to access and its associated operating system, DBMS, and network platform (if any) used to access the DBMS.

Each of the application, connectivity interface, driver/provider manager, driver/providers, and data sources (including their associated DBMSs) can be implemented with conventional or custom technology. Numerous configurations and connectivity schemes can be used, as will be apparent in light of this disclosure. The present invention is not intended to be limited to any one particular database access system configuration or connectivity scheme. Rather, a performance tuning wizard configured in accordance with an embodiment of the present invention can be used to tune any database access system. Example database access systems include DB2, Informix, Sybase, Microsoft SQL Server, and Oracle.

Performance Tuning Wizard

FIG. 1b is a block diagram of a user computing system configured with software wizard module for tuning database access middleware for optimal performance, in accordance with one embodiment of the present invention. In this example embodiment, the user computing system includes a browser in which the performance tuning wizard software module executes. Using a browser window to execute the wizard provides a number of benefits, in that the browser is operable on multiple platforms, is typically available on most computing systems, and provides a common user interface. In other embodiments, the wizard software module is implemented as an executable application that can be launched and run on the user's computing system independent of a browser. Note, however, that executing the wizard within a browser window provides the previous mentioned benefits, whether in a server-client configuration or not (e.g., local application configuration).

Further note that the user computing system configured with the wizard software module does not actually need to be in communication with the database access system. Rather the software wizard module can operate completely independent of and unconnected to the database access system. The user can launch or otherwise engage the wizard software module, either remotely or locally. For instance, the user can engage the wizard in a client-server arrangement as shown in FIG. 1, where a server downloads (via a network such as the Internet, local area network, or a combination thereof) the wizard to the user/client as a web page applet (e.g., JavaScript in an HTML page) that executes on the user's computer system. Alternatively, the wizard can execute on the server. Alternatively, the user can simply install the wizard locally (e.g., from a compact disc or other such medium), where the wizard then executes within a browser window or using its own interface (e.g., which can be configured for cross-platform operation or for a specific platform, using conventional techniques such as those used in a browser). One benefit of a server-based wizard is that product updates by database middleware vendors can be integrated into the system in an efficient and cost effective manner. In any case, the user engages the wizard, and then answers a series of questions posed by the wizard for a driver/provider (any type of middleware) of interest. Once the user has answered all of the wizard's questions for the driver/provider of interest, the wizard displays configuration results to the user. The user can then use the results in their particular application, or in a data source configuration tool. In addition, the user can copy and paste the results into a text file for reference. In any case, the configuration results allow the user to configure their database middleware to achieve optimal performance (or to confirm that their previously deployed middleware is optimally configured).

The user computing system on which the software wizard runs can be, for example, a desktop or laptop computer. Alternatively, the computing system can be a wireless device, such as a personal digital assistant (PDA) or other such computing device (e.g., smart phone). In short, the computing system can be any computer or device that can execute the wizard, and allows the user to interact with the wizard, so that an optimal configuration for the user's database middleware can be generated. In this embodiment, and as previously explained, the wizard runs as an applet within a browser window. The browser is applet-enabled and can be, for example, Microsoft's Internet Explorer browser, Netscape's Navigator browser, Mozilla's Firefox browser, OpenWave's mobile computing browser, or any other browsing or application software capable of communicating with a server via a network.

A specific embodiment of the performance tuning wizard will now be discussed in more detail with reference to FIGS. 2 and 3a through 3g.

Wizard Methodology

Figure 2:
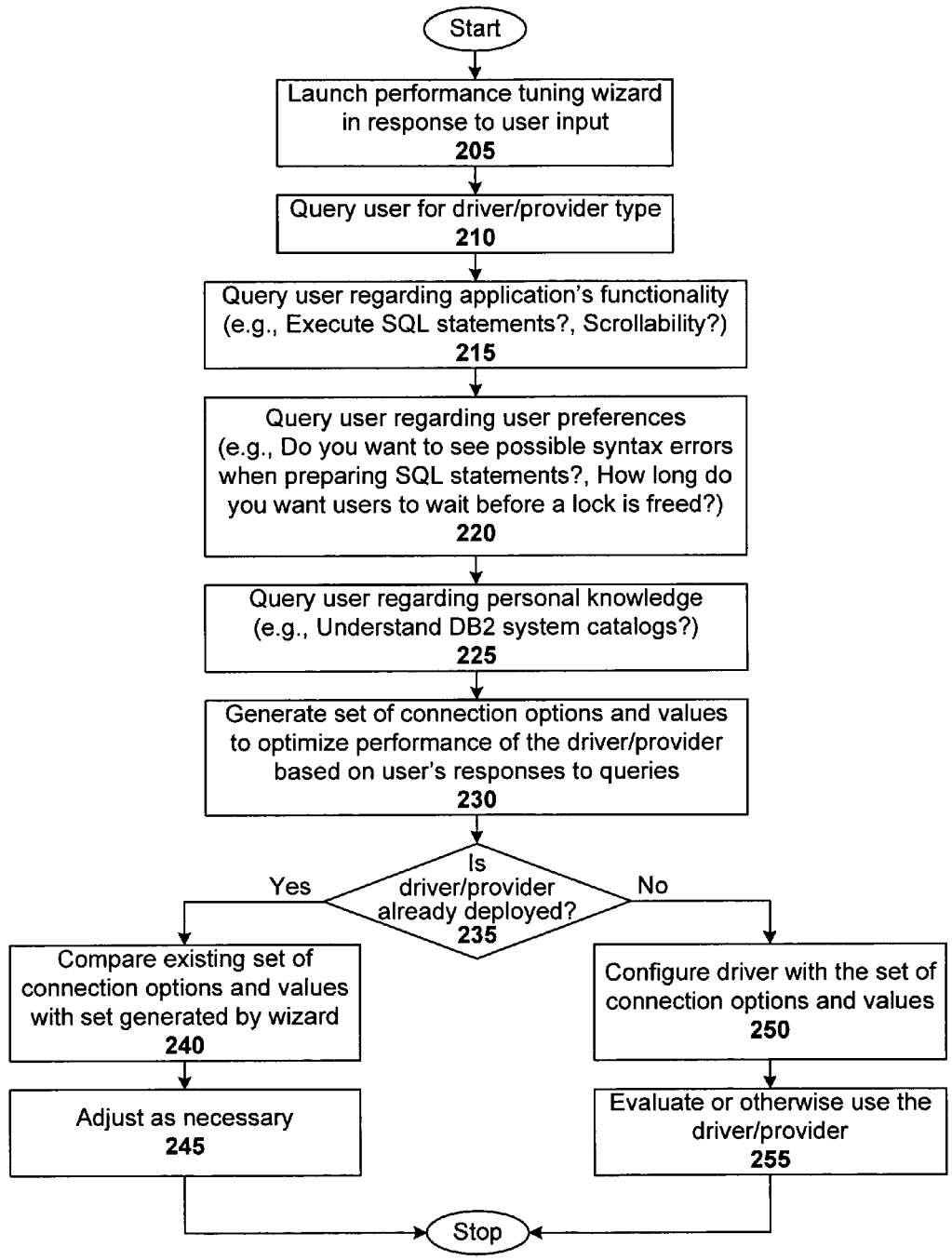
FIG. 2 illustrates a method for tuning database access middleware for optimal performance in accordance with one embodiment of the present invention.

FIG. 2 illustrates a method for tuning database access middleware for optimal performance in accordance with one embodiment of the present invention. As previously explained, the method can be implemented as an applet served in a web page (e.g., JavaScript in an HTML page). Alternatively, the method can be implemented as an executable application (e.g., Java, C, C++, or other object-oriented programming language) that is stored locally on the user's computing system. Alternatively, the method can be implemented in hardware (e.g., gate-level logic and a switching scheme, where the user answers questions by setting switches to appropriate positions, such as toggle switches for yes/no questions and rotary switches for multiple choice questions) or in firmware (e.g., microcontroller configured with one or more embedded routines for carrying out the wizard functionality).

The method is initiated by launching 205 the performance tuning wizard module in response to user input. For instance, the wizard can be launched in response to the user requesting an HTML page configured with an applet configured for carrying out the wizard functionality, as previously explained. Alternatively, the user can launch the application locally, without accessing any server or network. Numerous launching schemes will be apparent in light of this disclosure.

Figure 3A:
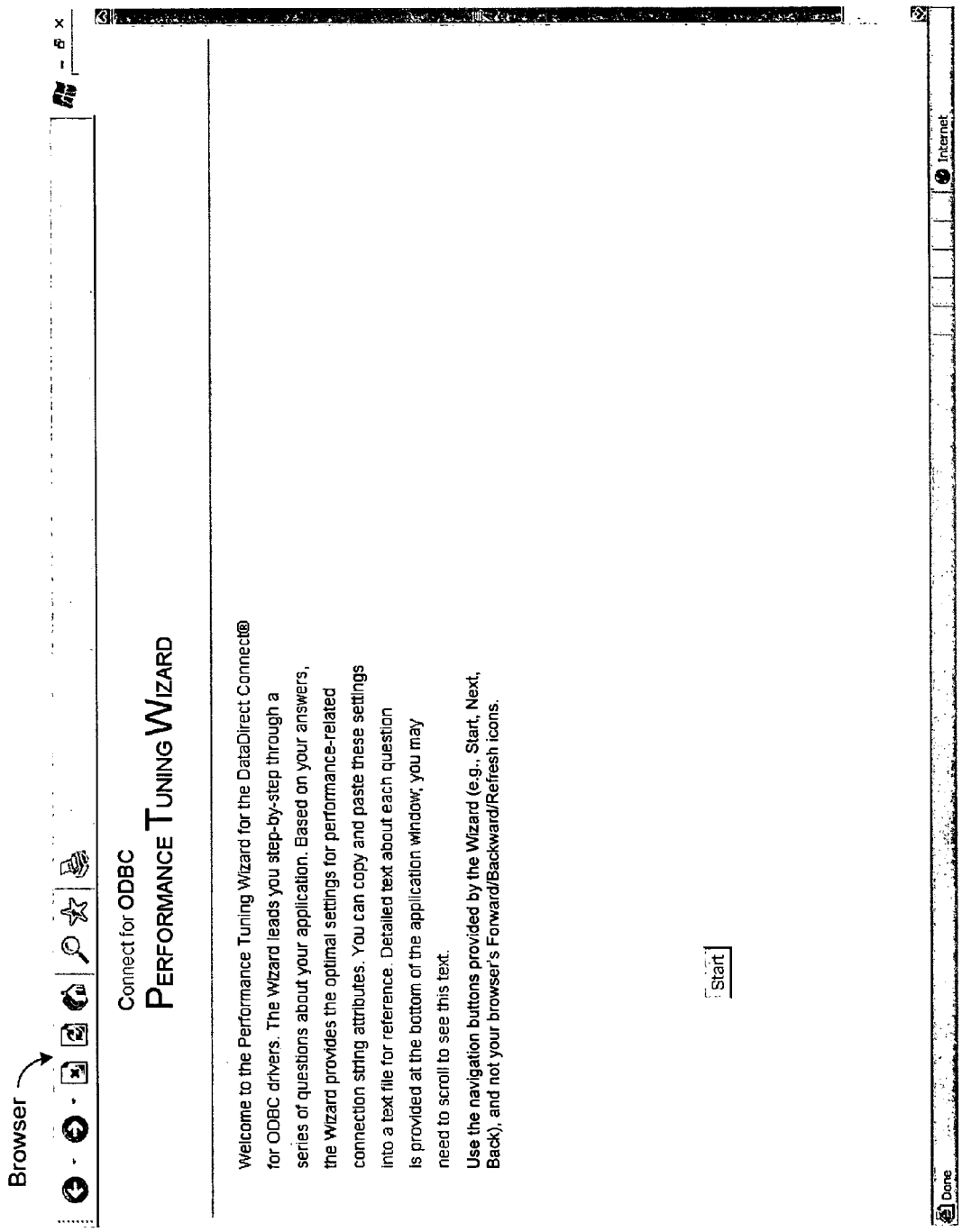
FIG. 3a illustrates an example welcome screen of a software wizard module for tuning database access middleware for optimal performance, in accordance with one embodiment of the present invention.

Once the wizard is launched, a welcome screen can be displayed using a display of the user's computing system, such as a monitor (e.g., CRT or flat panel) or LCD display of a mobile device. FIG. 3a illustrates one such example welcome screen, in accordance with one embodiment of the present invention. In this embodiment, the user can use an input device, such as a mouse or touchscreen/stylus, to select the "Start" button to begin the questioning process. Various other graphical user interface controls (e.g., "Next," "Back," "Display Results", check boxes, pull-down menus, and other such UI navigation buttons and selection mechanisms) can be used, as will be apparent with reference to other figures herein. Further, note that a non-visual interface could also be employed. For example, the wizard could be configured to communicate with the user using pre-recorded audio of the relevant questions. The user could respond to each audio question with concise verbal commands, such as "start," "yes," "no," "DB2," "Oracle Wire Protocol," "11 to 50," "over 200," and "less than 10 Mbytes." Conventional voice recognition capability of the wizard would capture the responses, and proceed accordingly. Numerous UI mechanisms and techniques can be used.

In any case, once launched or otherwise activated, the wizard carries out the method by interactively engaging the user to answer a number of questions regarding the particular database access system. Note that the wizard can be programmed or otherwise configured for tuning database middleware having a specific connectivity-type. For instance, the wizard can be configured for optimizing/assessing ODBC drivers, or JDBC drivers, or .NET providers. Alternatively, a single wizard can be configured to tune a plurality of database middleware connectivity-types, such as all three of ODBC drivers, JDBC drivers, and .NET providers. In one such case, the wizard's initial question to the user could be: "What is the connectivity-type of your database middleware: ODBC, JDBC, or .NET" where the user could choose one of the connectivity-types using radio buttons (or other GUI control).

Figure 3B:
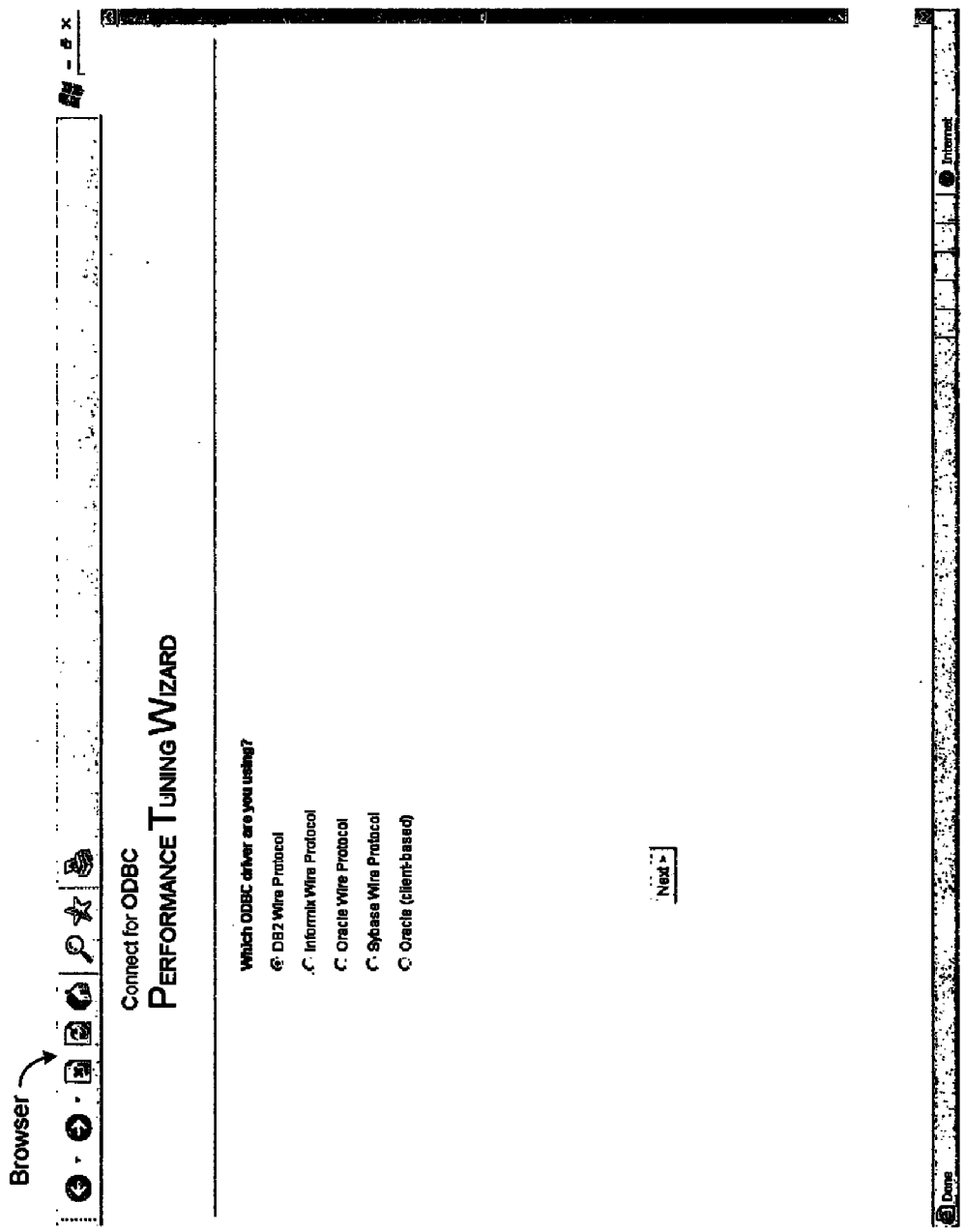
FIG. 3b illustrates an example driver selection screen of a software wizard module for tuning database access middleware for optimal performance, in accordance with one embodiment of the present invention.

In the embodiment shown in FIG. 2, the connectivity type is assumed to be known, and in particular, is ODBC. The method proceeds with querying 210 the user for the type of driver/provider. FIG. 3b illustrates an example ODBC driver selection screen, in accordance with one embodiment of the present invention. In this example, the user is given five choices of ODBC drivers: DB2 Wire Protocol, Informix Wire Protocol, Oracle Wire Protocol, Sybase Wire Protocol, and Oracle (client-based). For this discussion, assume the user selects the ODBC driver for DB2 Wire Protocol. The user can then click or otherwise select the "Next" navigation button to continue to the next question or screen.

The method continues with asking the user a series of questions. In the example of FIG. 2, this includes querying 215 the user regarding the application's functionality (e.g., Does your application execute SQL statements?, Does your application allow for scrolling?, Does your application use prepared statements?, Is your application multi-threaded), and querying 220 the user regarding user preferences associated with application performance (e.g., Do you want to see possible syntax errors when preparing SQL statements?, How long do you want users to wait before a lock is freed?, Do you need to access tables that are grouped in different schemas?, Do you want to configure connection pooling?), and querying the user regarding personal knowledge of database systems (e.g., Do you understand DB2 system catalogs?, Are you aware of network settings?). Numerous questions can be asked within each of these categories, as will be apparent in light of this disclosure, and the present invention is not intended to be limited to any line or lines or specific questioning.

Figure 3C:
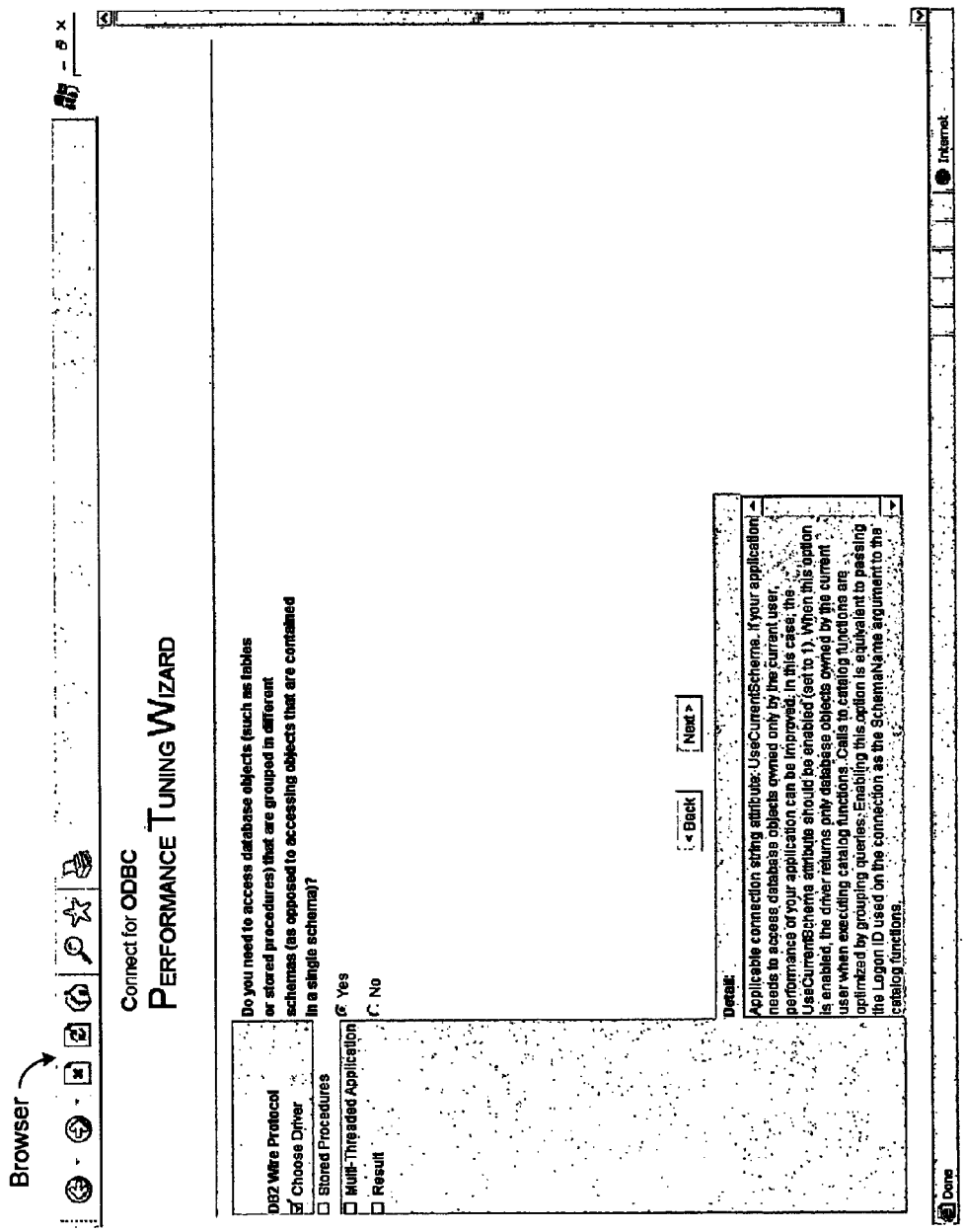
FIGS. 3c and 3d each illustrate an example user question screen of a software wizard module for tuning database access middleware for optimal performance, in accordance with one embodiment of the present invention.
Figure 3D:
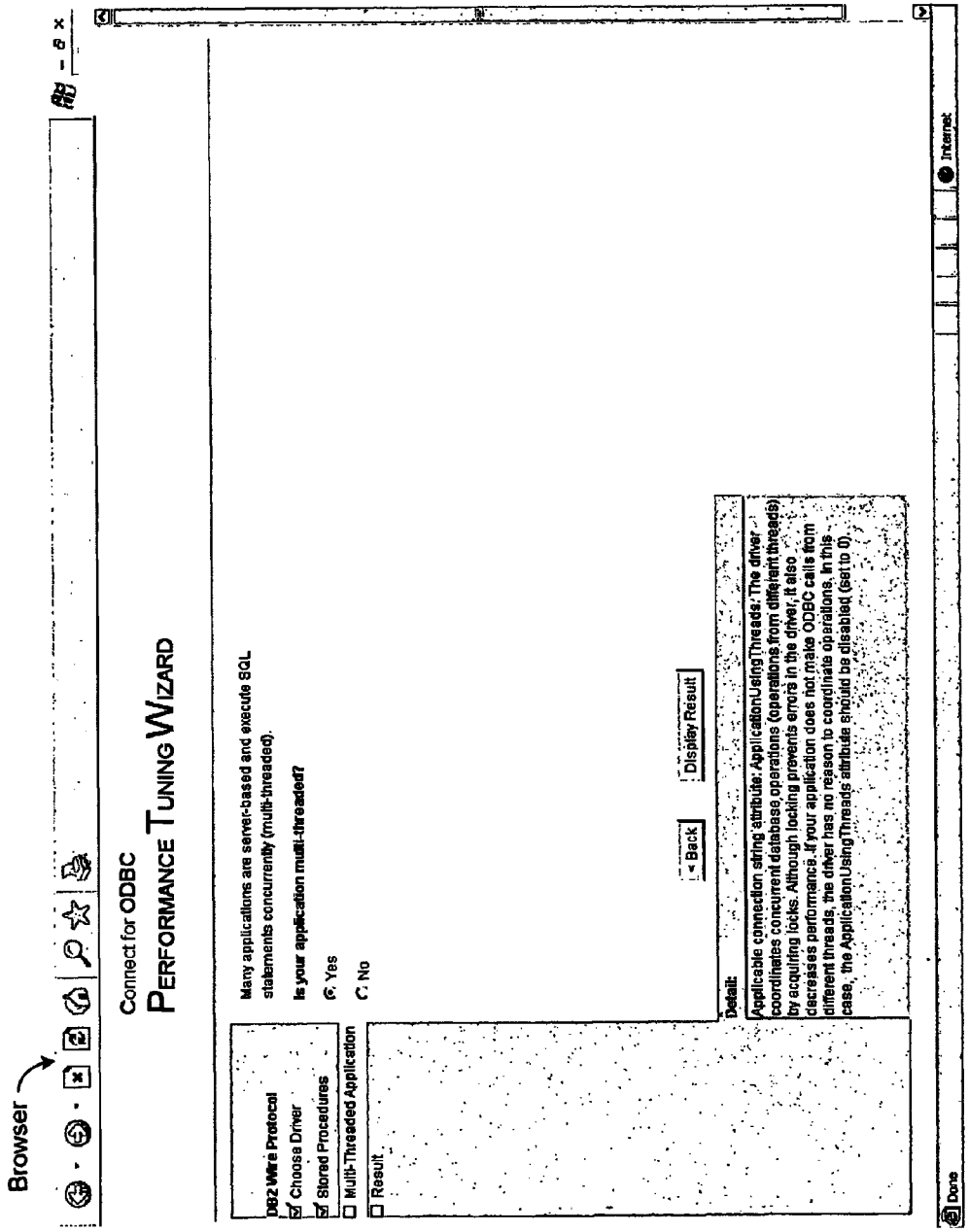

FIGS. 3c and 3d each illustrate an example user question screen of a software wizard module for tuning database access middleware for optimal performance, in accordance with one embodiment of the present invention. In particular, the example question shown in FIG. 3c is: "Do you need to access database objects (such as tables or stored procedures) that are grouped in different schemas (as opposed to accessing objects at are contained in a single schema)?", to which the user can respond yes or no by selecting the appropriate radio button. To the left of the question is a progress indicator that graphically shows the user the selected driver (which is "DB2 Wire Protocol" in this case), and where they are in the wizard process. In this particular example, question sets (which may be a single question) that have been answered are checked off (as is the case for the "Choose Driver" question set). Also, current question sets are indicated with highlighting that leads into the question area of the screen (as is the case for the "Store Procedure" question set). Forthcoming questions sets are also shown to the user ("Multi-Threaded Application" and "Result"). At the bottom of the screen is an optional "Detail:" section that indicates the applicable connection string attribute or property (based on the question being asked), and an explanation of how that attribute/property is used and how it impacts system performance. This optional detail section may further include other information, such as recommendations and lay person guidance for setting the applicable attribute/property. For longer explanations, note that a scroll bar or other suitable UI mechanism can be provided. The user can advance to the next screen using the "Next" control button, or go backward to the previous screen using the "Back" control button. Each screen can have similar UI controls. Assume the user answers the question with "yes." The example question presented in the next screen (shown in FIG. 3d) is: "Is your application multi-threaded?", to which the user can respond yes or no by selecting the appropriate radio button. A general statement precedes the question to set-up the context of the question for the user (in this particular example, the statement reads: "Many applications are server-based and execute SQL statements concurrently (multi-threaded)." The progress indicator and detail section are also present on the screen of FIG. 3d, as discussed with reference to FIG. 3c. Assume the user answers the question with "yes."

Figure 3E:
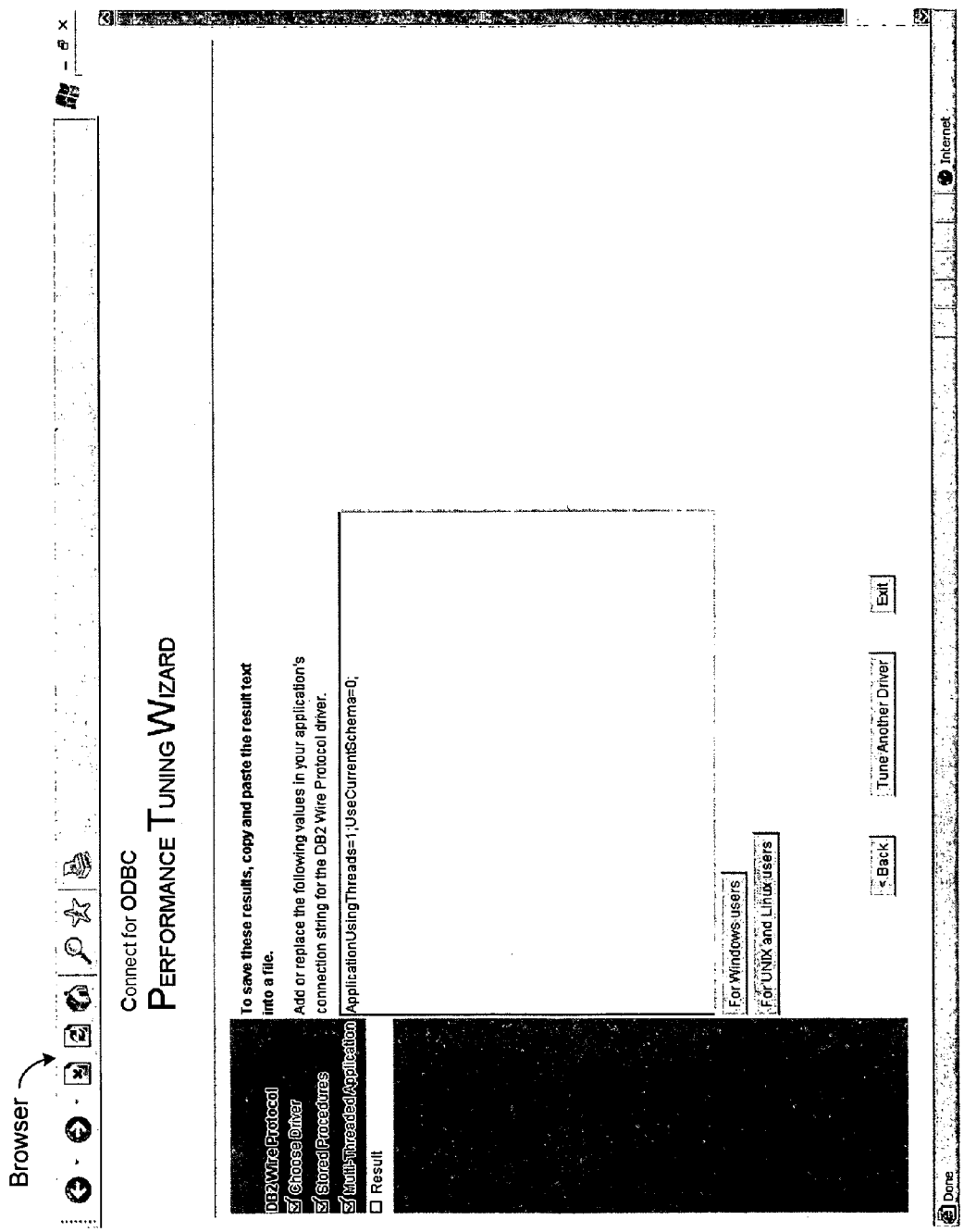
FIGS. 3e, 3f, and 3g each illustrate an example results screen of a software wizard module for tuning database access middleware for optimal performance, in accordance with one embodiment of the present invention.
Figure 3F:
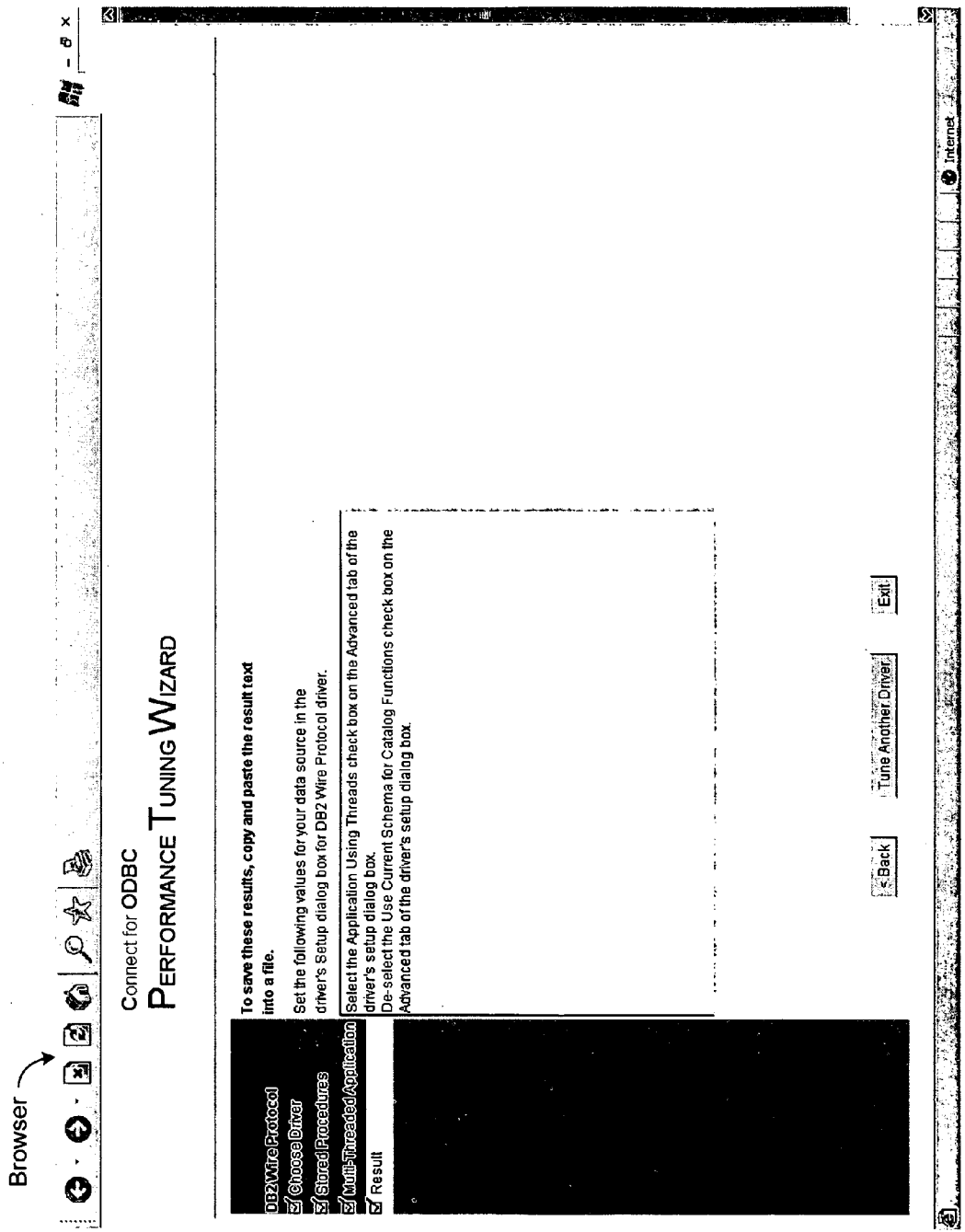
Figure 3G:
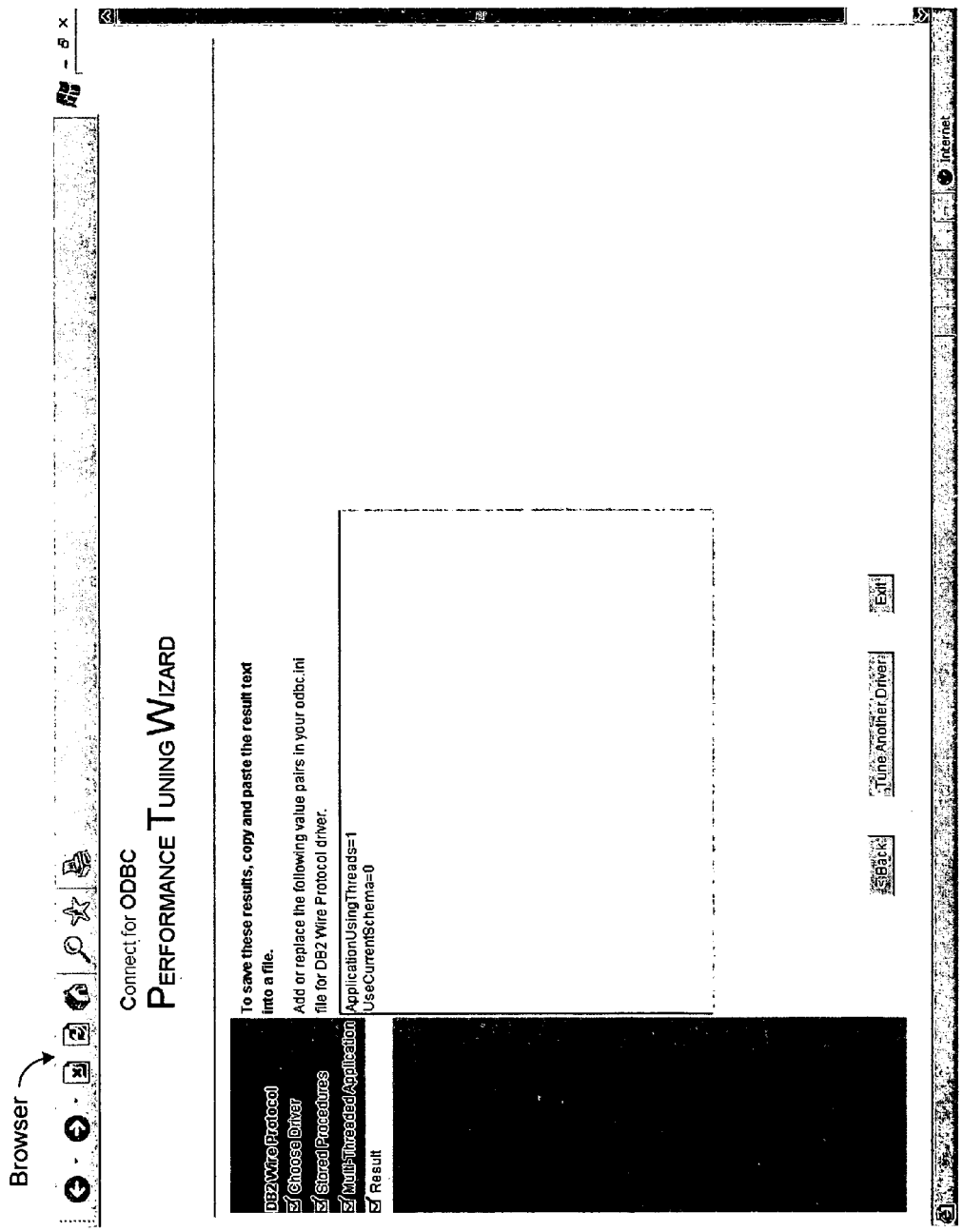

Numerous question flows can be implemented, as will be apparent in light of this disclosure. Examples of such flows will be discussed in turn. In any case, once the user has answered all the necessary questions, the method of FIG. 2 continues with generating 230 a set of connection options and values to optimize performance of the driver/provider based on user's responses to queries. The results can then be displayed to the user. FIGS. 3e, 3f, and 3g each illustrate an example results screen of a software wizard module for tuning database access middleware for optimal performance, in accordance with one embodiment of the present invention. With reference to FIG. 3e, the applicable connection properties and their respective values ("ApplicationUsingThreads=1;UseCurrentSchema=0;) are displayed for the user. The results page also includes a "For Windows users" control button and a "For UNIX and Linux users" control button, which when selected automatically put the results into the appropriate corresponding format. For example, FIG. 3f shows the result screen if the "For Windows users" control button is selected. Note the more explicit user instructions: "Select the Application Using Threads check box on the Advanced Tab of the driver's setup dialog box. De-select the Use Current Schema for Catalog Functions check box on the Advanced Tab of the driver's setup dialog box." FIG. 3g shows the result screen if the "For UNIX and Linux users" control button is selected, which displays the results with a hard return between each of the applicable connection properties. In any case, the results can then be printed and/or saved to a file (e.g., by a cut-and-paste operation, or a "save as" function of the wizard) for subsequent reference. On any of the result screen pages, the UI controls allow the user to "Tune Another Driver" (at which point the first question page is displayed to begin the process again) or to go "Back" to the previous page or to "Exit" to terminate the wizard.

The method continues with determining 235 if the driver/provider is already deployed. If the driver/provider is already deployed, then the method may further include comparing 240 an existing set of connection options and values to the set generated by the wizard, and adjusting 245 as necessary. If the driver/provider is not already deployed, then the method continues with the user configuring 250 the driver/provider with the set of connection options and values generated by the wizard. The user can then continue with evaluating 255 or otherwise using the driver/provider.

Example DB2 Question Flow for JDBC Connectivity

An example DB2 question flow for JDBC connectivity that can be programmed or otherwise configured into the performance tuning wizard, in accordance with an embodiment of the present invention, is a follows (the applicable connection string attribute or property which will be set by the wizard based on how the question or question set is answered, is shown in bold after the initial question):

Question 1: Does your application access DB2 UDB 7.1 or 7.2 for Windows/UNIX/Linux, DB2 for OS/390, or DB2 for iSeries?
(CatalogIncludesSynonyms)
  If NO, set to true and go to Question 2.
  If YES, Does your application use the concept of DB2 database table synonyms?
    If YES, set to true and go to Question 2.
    If NO, set to false and go to Question 2.
Question 2: Do you understand DB2 system catalogs? (CatalogSchema)
  If NO, do not set a value and go to Question 3.
  If YES, Many DB2 installations contain an extremely large number of database objects that are contained within a default database schema. All of these database objects may not be relevant to your application. Therefore, database administrators, at times, will define a subset of the information for your specific use. Does your application access information that is in a schema other than the default.
    If NO, do not seta value and go to Question 3.
    If YES, What is the name of the schema? Set to the value entered and go to Question 3.
Question 3: Does your application allow the ability to go through results both forwards and backwards (scrollable result sets)? (InsensitiveResultSetBufferSize)
  If NO, set to 2048 and go to Question 4.
  If YES, Insensitive (sometimes referred to as static) scrollable result sets cache result data on the client side. If the result set is too large to fit in memory, the driver has the option to write the results to disk. Do you want the driver to write results that cannot fit in memory to disk?
    If NO, set to −1 and go to Question 4.
    If YES, What is the maximum memory that you want to allocate for scrollable result sets per statement before writing results to disk?
      256 K (Set to 256 (values set in kilobytes))
      512 K (Set to 512)
      1 MB (Set to 1024)
      2 MB (Set to 2048)
      4 MB (Set to 4096)
      8 MB (Set to 8192)
      16 MB (Set to 16384)
      32 MB (Set to 32768)
      64 MB (Set to 65536)
      Unlimited (Set to 0)
      Other: (Edit field)
    and continue to Question 4.
Question 4: SQL statements can be stored in the database engine to make your application achieve substantial performance improvements if your application uses the same SQL statement multiple times. This type of SQL statement is called a prepared statement, which is compiled once for a connection and then is available to that connection to be executed many times until the connection is closed. Does your application use prepared statements? (MaxPooledStatements)
  If NO, set to 0 and go to Question 5.
  If YES, Does your application run from within an application server or another application that provides statement caching?
    If YES, set to 0 and go to Question 5.
    If NO, How many different prepared SQL statements does your application use?
      1-30 (Set to 30)
      30-100 (Set to 100)
      100-200 (Set to 200)
      >200 (Set to 400)
    and continue to Question 5.
Question 5: Which version of DB2 were your database tables created with?
(SendStreamAsBlob)
  DB2 UDB v8.1 for Windows/UNIX/Linux or later
  DB2 UDB v6 for OS/390 or later
  DB2 UDB v5R2 for AS/400 or later
  None of the above
    If "None of the above", set option to false, which is the default, and go to Question 6. If any of the other answers, Is your long binary data stored in DB2 Blob columns or DB2 Long Varchar for Bit Data columns?
    Blob (Set to true)
    Long Varchar for Bit Data (set to false)
    Don't know (do not display in results)
  continue to Question 6.
Question 6: Do any SQL statements in your application contain newline characters? (StripNewlines)
  If YES, set to true and go to Question 7.
  If NO, set to false and go to Question 7.
Question 7: Do you need to access tables or PL/SQL routines that are grouped in different schemas (as opposed to accessing objects that are contained in a single schema)? (UseCurrentSchema)
  If NO, set to false and stop.
  If YES, set to true and stop.

Note that graphical user interface techniques such as those discussed with reference to FIGS. 3a through 3g can be used to navigate and display each of the questions (including each question within a question set for any one applicable connection string attribute or property) on its own page/screen, along with the appropriate choices from which the user can select (e.g., using radio buttons, pull-down menus, edit boxes, or other suitable GUI features. Further note that a separate "Detail" section can be provided as shown in FIGS. 3c and 3d, or such detail can be provided in the same area as the question (as shown in this flow example), when appropriate. These notes equally apply to each flow described herein.

Example Informix Question Flow for JDBC Connectivity
An example Informix question flow for JDBC connectivity that can be programmed or otherwise configured into the performance tuning wizard, in accordance with an embodiment of the present invention, is a follows (the applicable connection string attribute or property which will be set by the wizard based on how the question or question set is answered, is shown in bold after the initial question):

Question 1: Does your application allow the ability to go through results both forwards and backwards (scrollable result sets)? (InsensitiveResultSetBufferSize)
  If NO, set to 2048 and go to Question 2.
  If YES, Insensitive (sometimes referred to as static) scrollable result sets cache result data on the client side. If the result set is too large to fit in memory, the driver has the option to write the results to disk. Do you want the driver to write results that cannot fit in memory to disk?
    If NO, set to −1 and go to Question 2.
    If YES, What is the maximum memory that you want to allocate for scrollable result sets per statement before writing results to disk?
      256 K (Set to 256 (values set in kilobytes))
      512 K (Set to 512)
      1 MB (Set to 1024)
      2 MB (Set to 2048)
      4 MB (Set to 4096)
      8 MB (Set to 8192)

16 MB (Set to 16384)
32 MB (Set to 32768)
64 MB (Set to 65536)
Unlimited (Set to 0)
Other: (Edit field)
and continue to Question 2.

Question 2: SQL statements can be stored in the database engine to make your application achieve substantial performance improvements if your application uses the same SQL statement multiple times. This type of SQL statement is called a prepared statement, which is compiled once for a connection and then is available to that connection to be executed many times until the connection is closed. Does your application use prepared statements? (MaxPooledStatements)
  If NO, set to 0 and STOP.
  If YES, Does your application run from within an application server or another application that provides statement caching?
    If YES, set to 0 and STOP.
    If NO, How many different prepared SQL statements does your application use?
      1-30 (Set to 30)
      30-100 (Set to 100)
      100-200 (Set to 200)
      >200 (Set to 400)
      and STOP.

Example Oracle Question Flow for JDBC Connectivity

An example Oracle question flow for JDBC connectivity that can be programmed or otherwise configured into the performance tuning wizard, in accordance with an embodiment of the present invention, is a follows (the applicable connection string attribute or property which will be set by the wizard based on how the question or question set is answered, is shown in bold after the initial question):

Question 1: Does your application execute SQL Select statements that return more than one row of data AND do the returned rows have repeating data in some or all of the columns? (WireProtocolMode)
  If NO, set to 1 and go to Question 2.
  If YES, Is the repeated data in consecutive rows (for example, is the data in column1/row1, the same as the data in column1/row2)?
    If NO, set to 1 and go to Question 2.
    If YES, set to 2 and go to Question 2.

Question 2: Does your application allow the ability to go through results both forwards and backwards (scrollable result sets)? (InsensitiveResultSetBufferSize)
  If NO, set to 2048 and go to Question 3.
  If YES, Insensitive (sometimes referred to as static) scrollable result sets cache result data on the client side. If the result set is too large to fit in memory, the driver has the option to write the results to disk. Do you want the driver to write results that cannot fit in memory to disk?
    If NO, set to −1 and go to Question 3.
    If YES, What is the maximum memory that you want to allocate for scrollable result sets per statement before writing results to disk?
      256 K (Set to 256 (values set in kilobytes))
      512 K (Set to 512)
      1 MB (Set to 1024)
      2 MB (Set to 2048)
      4 MB (Set to 4096)
      8 MB (Set to 8192)
      16 MB (Set to 16384)
      32 MB (Set to 32768)
      64 MB (Set to 65536)
      Unlimited (Set to 0)
      Other: (Edit field)
      and continue to Question 3.

Question 3: SQL statements can be stored in the database engine to make your application achieve substantial performance improvements if your application uses the same SQL statement multiple times. This type of SQL statement is called a prepared statement, which is compiled once for a connection and then is available to that connection to be executed many times until the connection is closed. Does your application use prepared statements? (MaxPooledStatements)
  If NO, set to 0 and go to Question 4.
  If YES, Does your application run from within an application server or another application that provides statement caching?
    If YES, set to 0 and go to Question 4.
    If NO, How many different prepared SQL statements does your application use?
      1-30 (Set to 30)
      30-100 (Set to 100)
      100-200 (Set to 200)
      >200 (Set to 400)
      and continue to Question 4.

Question 4: Does your application perform batch operations? (BatchPerformanceWorkaround)
  If NO, set to false and go to Question 5.
  If YES, does your application use the update count information returned by the batch operations?
    If NO, set to true and go to Question 5.
    If YES, set to false (the default) and go to Question 5.

Question 5: Does your application use the Oracle concept of SYNONYMs? (CatalogOptions)
  If NO, Does your application use the Oracle concept of Remarks?
    If YES, set to 1 and go to Question 6.
    If NO, set to 0 and go to Question 6.
  If YES, Does your application also use the Oracle concept of Remarks?
    If YES, set to 3 and go to Question 6.
    If NO, set to 2 and go to Question 6.

Question 6: Do you have a batch environment with a low number of users? (ServerType)
  If YES, set to Dedicated and STOP.
  If NO,
  Does your Oracle DBMS run on a Windows server?
    If YES, set to Dedicated and STOP.
    If NO,
    Does your Oracle server have excess processing capacity and memory available when at maximum load?
      If YES, set to Dedicated and STOP.
      If NO,
      Do you have an application that requires maximum performance at the expense of using more Oracle server resources?
        If YES, set to Dedicated and STOP.
        If NO, do not set and STOP.

Example SQL Server Question Flow for JDBC Connectivity

An example SQL Server question flow for JDBC connectivity that can be programmed or otherwise configured into the performance tuning wizard, in, accordance with an embodiment of the present invention, is a follows (the applicable connection string attribute or property which will be set by the wizard based on how the question or question set is answered, is shown in bold after the initial question):

Question 1: Does your application allow the ability to go through results both forwards and backwards (scrollable result sets)? (InsensitiveResultSetBufferSize)
  If NO, set to 2048 and go to Question 2.
  If YES, Insensitive (sometimes referred to as static) scrollable result sets cache result data on the client side. If the result set is too large to fit in memory, the driver has the option to write the results to disk. Do you want the driver to write results that cannot fit in memory to disk?
    If NO, set to −1 and go to Question 2.
    If YES, What is the maximum memory that you want to allocate for scrollable result sets per statement before writing results to disk?
      256 K (Set to 256 (values set in kilobytes))
      512 K (Set to 512)
      1 MB (Set to 1024)
      2 MB (Set to 2048)
      4 MB (Set to 4096)
      8 MB (Set to 8192)
      16 MB (Set to 16384)
      32 MB (Set to 32768)
      64 MB (Set to 65536)
      Unlimited (Set to 0)
      Other: (Edit field)
    and continue to Question 2.

Question 2: SQL statements can be stored in the database engine to make your application achieve substantial performance improvements if your application uses the same SQL statement multiple times. This type of SQL statement is called a prepared statement, which is compiled once for a connection and then is available to that connection to be executed many times until the connection is closed. Does your application use prepared statements? (MaxPooledStatements)
  If NO, set to 0 and go to Question 3.
  If YES, Does your application run from within an application server or another application that provides statement caching?
    If YES, set to 0 and go to Question 3.
    If NO, How many different prepared SQL statements does your application use?
      1-30 (Set to 30)
      30-100 (Set to 100)
      100-200 (Set to 200)
      >200 (Set to 400)
    and continue to Question 3.

Question 3: Does your application update database tables?
  If NO, go to Question 4.
  If YES, go to Question 3a.

Question 3a: Is the application updating or inserting string data?
(SendStringParametersAsUnicode)
  If NO, set to true and go to Question 3b.
  If YES, Is the string data the application is sending to the database have the same character encoding as the database?
    If YES, set to False and go to Question 3b.
    If NO, set to true (the default).
    If Don't know, go to Question 3b and don't display this connection option in the results.

Question 3b: Does your application allow the ability to go through results both forwards and backwards (scrollable result sets)?
(UseServeSideUpdateableCursors)
  If NO, set to false and go to Question 4.
  If YES, Do these result sets allow updates (updateable result sets)?
    If NO, set to false and go to Question 4.
    If YES, Do the database tables to be updated contain a primary key?
      If NO, set to false and go to Question 4.
      If YES, set to true and go to Question 4.

Question 4: Does your application contain SQL statements that retrieve large amounts of data (2 MB or greater)? (SelectMethod)
  If NO, set to Direct and STOP.
  If YES, Does your application often execute a SQL statement before processing or closing the previous result set?
    If NO, set to Direct and STOP.
    If YES, Does your application only allow the ability to scroll forwards through large results (forward-only cursors)?
      If NO, set to Direct and STOP.
      If YES, set to Cursor and STOP.

Example Sybase Question Flow for JDBC Connectivity

An example Sybase question flow for JDBC connectivity that can be programmed or otherwise configured into the performance tuning wizard, in accordance with an embodiment of the present invention, is a follows (the applicable connection string attribute or property which will be set by the wizard based on how the question or question set is answered, is shown in bold after the initial question):

Question 1: Does your application allow the ability to go through results both forwards and backwards (scrollable result sets)? (InsensitiveResultSetBufferSize)
  If NO, set to 2048 and go to Question 2.
  If YES, Insensitive (sometimes referred to as static) scrollable result sets cache result data on the client side. If the result set is too large to fit in memory, the driver has the option to write the results to disk. Do you want the driver to write results that cannot fit in memory to disk?
    If NO, set to −1 and go to Question 2.
    If YES, What is the maximum memory that you want to allocate for scrollable result sets per statement before writing results to disk?
      256 K (Set to 256 (values set in kilobytes))
      512 K (Set to 512)
      1 MB (Set to 1024)
      2 MB (Set to 2048)
      4 MB (Set to 4096)
      8 MB (Set to 8192)
      16 MB (Set to 16384)
      32 MB (Set to 32768)
      64 MB (Set to 65536)
      Unlimited (Set to 0)
      Other: (Edit field)
    and continue to Question 2.

Question 2: SQL statements can be stored in the database engine to make your application achieve substantial performance improvements if your application uses the same SQL statement multiple times. This type of SQL statement is called a prepared statement, which is compiled once for a connection and then is available to that connection to be executed many times until the connection is closed. Does your application use prepared statements?
  If NO, set to 0 and go to Question 3.
  If YES, go to Question 2a.

Question 2a: Does your application run from within an application server or another application that provides statement caching? (MaxPooledStatements)
  If YES, set to 0 and go to Question 2b.

If NO, How many different prepared SQL statements does your application use?
1-30 (Set to 30)
30-100 (Set to 100)
100-200 (Set to 200)
>200 (Set to 400)
and continue to Question 2b.

Question 2b: Does your application typically execute individual prepared statement more than once? (PrepareMethod)
If YES, set to StoredProc and go to Question 3.
If NO, set to Direct and go to Question 3.
If Don't know, do not display this connection option in the results and go to Question 3.

Question 3: Does your application perform batch operations?
(BatchPerformanceWorkaround)
If NO, set to false and go to Question 4.
If YES, Is it important that the driver always be able to return update counts for batch operations?
If NO, set to true and go to Question 4.
If YES, set to false (the default) and go to Question 4.
If Don't know, go to Question 4 and don't display this connection option in the results.

Question 4: Does your application contain SQL statements that retrieve large amounts of data (2 MB or greater)? (SelectMethod)
If NO, set to Direct and STOP.
If YES, Does your application often execute a SQL statement before processing or closing the previous result set?
If NO, set to Direct and STOP.
If YES, Does your application only allow the ability to scroll forwards through large results (forward-only cursors)?
If NO, set to Direct and STOP.
If YES, set to Cursor and STOP.

Example DB2 Question Flow for .NET Connectivity

An example DB2 question flow for .NET connectivity that can be programmed or otherwise configured into the performance tuning wizard, in accordance with an embodiment of the present invention, is a follows (the applicable connection string attribute or property which will be set by the wizard based on how the question or question set is answered, is shown in bold after the initial question):

Question 1: Does your application execute SQL Select statements?
If NO, go to Question 2.
If YES, go to Question 1a.

Question 1a: Does your application issue a fixed set of SQL queries throughout the life of the application (as compared to ad hoc queries) (for example, "select * from emp where ssn=?")? (Cache Column Info)
If NO, set to true and go to Question 1b.
If YES,
Does your application connect and disconnect after each logical unit of work?
If YES, set to true and go to Question 1b.
If NO, set to false and go to Question 1b.

Question 1b: Do the cursors in your application keep their position in the result set after a commit? (Cursors With Hold)
If YES, set to true and go to Question 2.
If NO, set to false and go to Question 2.

Question 2: SQL statements can be stored in the database engine to make your application achieve substantial performance improvements if your application uses the same SQL statement multiple times. This type of SQL statement is called a prepared statement, which is compiled once for a connection and then is available to that connection to be executed many times until the connection is closed. Does your application use prepared statements? (Defer Prepare)
If NO, set to true and go to Question 3.
If YES, Do you want to see possible syntax errors when preparing statements?
If YES, set to false and continue to Question 3.
If NO, set to true and continue to Question 3.

This next set of questions is the connection pooling question set (Question 3, including 3a through 3d, in this flow), and is asked for all .NET providers and will always be the next to last question in the flow of questions, in accordance with one embodiment of the present invention.

Question 3: Connection pooling allows you to reuse connections rather than create a new one every time the data provider needs to establish a connection to the underlying database. Do you want to configure connection pooling? (Pooling)
If NO, set to false and continue to last question in flow.
If YES, set to true and ask the following questions.

Question 3a: Do you want to limit the amount of time connections stay unused in the connection pool?
If NO, set to 0 and go to Question 3b.
If YES, How long do you want the connections to stay in the connection pool?
(Connection Lifetime)
1 minute (set to 60 (value must be set in seconds))
5 minutes (set to 300)
10 minutes (set to 600)
30 minutes (set to 1800)
3 hours (set to 10800)
and continue to Question 3b.

Question 3b: After connecting, some applications change the initial configuration settings (such as database name). When this occurs, the changed values are propagated to future uses of the connection. Therefore, a re-used connection may not work as expected. Will your application change any of the initial configuration settings? (Connection Reset)
If YES, set to true and go to Question 3c.
If NO, set to false and go to Question 3c.

Question 3c: What is the maximum number of connections that you want to make available to your application? (Max Pool Size)
100 (Set to 100)
200 (Set to 200)
500 (Set to 500)
>500 (Set to 1000)
and continue to Question 3d.

Question 3d: When a connection pool is created, do you want to populate it with a minimum number of connections and retain this number of connections for the lifetime of the connection pool?
If NO, continue to last question in flow.
If YES, What is the minimum number of connections that you want maintained in the connection pool? (Min Pool Size)
5 (Set to 5)
20 (Set to 20)
100 (Set to 100)
500 (Set to 500)
and continue to last question in flow.

Question 4: Does your application need to connect to more than one database at a time? (Enlist)
  If YES, set to true and STOP.
  If NO, set to false and STOP.
Example Oracle Question Flow for .NET Connectivity An example Oracle question flow for .NET connectivity that can be programmed or otherwise configured into the performance tuning wizard, in accordance with an embodiment of the present invention, is a follows (the applicable connection string attribute or property which will be set by the wizard based on how the question or question set is answered, is shown in bold after the initial question):

Question 1: Does your application execute SQL Select statements?
  If NO, go to Question 2.
  If YES, continue to Question 1a.
  Question 1a: Does your application issue a fixed set of SQL queries throughout the life of the application (as compared to ad hoc queries) (for example, "select * from emp where ssn=?")?
    (Cursor Description Cache)
  If NO, set to false and go to Question 1b.
  If YES,
  Does your application connect and disconnect after each logical unit of work?
    If YES, set to true and go to Question 1b.
    If NO, set to false and go to Question 1b.
  Question 1b (part 1): How many rows are typically returned when executing Select statements? (Fetch Array Size)
    1 (A=10) If this is selected, ask Question 1b (part 2) and skip Question 1c. Any other answer, ask Question 1b (part 2) and include Question 1c in flow.
    2-10 (A=10)
    11-50 (A=50)
    51-200 (A=200)
    Over 200 (A=500)
  Question 1b (part 2): How many result columns are typically returned when executing Select statements?
    11-5 (B=5)
    6-10 (B=10)
    11-20 (B=10)
    Over 20 (B=40)
  The value of Question 1b (part 1) is A and the value of Question 1b (part 2) is B. The wizard calculates X using the following formula: $X=A*B*50$. The wizard then determines the Fetch Array Size as follows:
    $X<=16,000$ (set to 16,000)
    $X<=32,000$ (set to 32,000)
    $X<=64,000$ (set to 64,000)
    $X<=128,000$ (set to 128,000)
    $X>128,000$ (set to 256,000)
  Question 1 c: Do the returned rows have repeating data in some or all of the columns?
    (WireProtocolMode)
    If NO, set to 1 and go to Question 2.
    If YES, Is the repeated data in consecutive rows (for example, is the data in column1/row, the same as the data in column1/row2)?
      If NO, set to 1 and go to Question 2.
      If YES, set to 2 and go to Question 2.
Question 2: Do you have a batch environment with a low number of users?
(Server Type)
  If YES, set to Dedicated and go to Question 3.
  If NO,
  Does your Oracle DBMS run on a Windows server?
    If YES, set to Dedicated and go to Question 3.
    If NO,
    Does your Oracle server have excess processing capacity and memory available when at maximum load?
      If YES, set to Dedicated and go to Question 3.
      If NO,
      Do you have an application that requires maximum performance at the expense of using more Oracle server resources?
        If YES, set to Dedicated and go to Question 3.
        If NO, set to empty string, which is the default.
Question 3: Connection pooling questions previously discussed.
Question 4: Does your application need to connect to more than one database at a time? (Enlist)
  If YES, set to true and STOP.
  If NO, set to false and STOP.
Example SQL Server and Sybase Question Flow for .NET Connectivity An example SQL Server and Sybase question flow for .NET connectivity that can be programmed or otherwise configured into the performance tuning wizard, in accordance with an embodiment of the present invention, is a follows (the applicable connection string attribute or property which will be set by the wizard based on how the question or question set is answered, is shown in bold after the initial question):

Question 1: Does your application retrieve images, pictures or long text or binary fields?
  If NO, set to 1048576 (the default) go to Question 2.
  If YES, What is the maximum size of images, pictures, or long text or binary fields? (Text Size)
    <1 MB (set to 1048576 (values must be set in bytes))
    <2 MB (set to 2097152)
    <5 MB (set to 5242880)
    <10 MB (set to 10485760)
    >10 MB (set to 52428800)
    and continue to Question 2.
Question 2: Does your application use more than one SQL statement?
  If NO, set to false and go to Question 3.
  If YES, If the application needs another active statement and the existing connection can't provide one, do you want the data provider to make a copy of the existing connection? (Clone Connection If Needed)
    If YES, set to true and go to Question 3.
    If NO, set to false and go to Question 3.
Question 3: To obtain maximum performance, the TCP-IP network configuration settings of the database and the ODBC driver networking options should be the same. In many cases, database application users are not aware of the network settings. Are you aware of network settings such as the maximum network packet size configured on the database server? (Packet Size)
  If NO, set to 0 and go to Question 4.
  If YES,
  What is the network packet size of your SQL Server (Sybase Server)?
    512b (set to 512)
    2560b (set to 2560)
    5120b (set to 5120)
    10240b (set to 10240)
    Other (edit field where user can enter an integer value up to 10240 in increments of 512) Set to value entered.
  and continue to Question 4.
Question 4: Does your application execute SQL statements that retrieve 1K of data or more through DataReaders?

If NO, set Select Method to Direct (the default) and Fetch Buffer Size to 1024 (the default). Continue to Question 5.
If YES, How large is the largest result set?
<20K (set Fetch Buffer Size to 20K (values must be set in bytes))
<50K (set Fetch Buffer Size to 50K)
<100K (set Fetch Buffer Size to 100K)
<1 MB (set Fetch Buffer Size to 1 MB)
<2 MB (set Fetch Buffer Size to 2 MB)
>2 MB (set Fetch Buffer Size to default 1024 AND ask next question)
Does your application ever execute a SQL statement before processing or closing the previous result set?
If YES, set Select Method to Cursor and go to Question 5.
If NO, set Select Method to Direct (the default) and go to Question 5.
Question 5: Connection pooling questions previously discussed.
Question 6: Does your application need to connect to more than one database at a time? (Enlist)
If YES, set to true and STOP.
If NO, set to false and STOP.

Example Oracle WP and Oracle Question Flow for ODBC Connectivity

An example Oracle Wire Protocol (WP) and Oracle question flow for ODBC connectivity that can be programmed or otherwise configured into the performance tuning wizard, in accordance with an embodiment of the present invention, is a follows (the applicable connection string attribute or property which will be set by the wizard based on how the question or question set is answered, is shown in bold after the initial question):

Question 1: Does your application execute SQL Select statements?
If NO, go to Question 2.
If YES, go to Question 1a.
Question 1a (part 1): How many rows are typically returned when executing Select statements? (ArraySize)
1 (A=10) If this is selected, ask Question 1a (part 2) and skip Question 1b. Any other answer, ask Question 1a (part 2) and include Question 1b in flow.
2-10 (A=10)
11-50 (A=50)
51-200 (A=200)
Over 200 (A=500)
Question 1a (part 2): How many result columns are typically returned when executing Select statements?
1-5 (B=5)
6-10 (B=10)
11-20 (B=20)
Over 20 (B=40)
The value of Question 1a (part 1) is A and the value of Question 1a (part 2) is B.
The wizard calculates X using the following formula: X=A*B*50. The
wizard then determines the ArraySize as follows:
X<=16,000 (set to 16,000)
X<=32,000 (set to 32,000)
X<=64,000 (set to 64,000)
X<=128,000 (set to 128,000)
X>128,000 (set to 256,000)
and continue to Question 1b.
Question 1b: Do the returned rows have repeating data in some or all of the columns? (WireProtocolMode)
If NO, set to 1 and go to Question 1c.
If YES, Is the repeated data in consecutive rows (for example, is the data in column1/row1, the same as the data in column1/row2)?
If NO, set to 1 and go to Question 1c.
If YES, set to 2 and go to Question 1c.
Question 1c: Does your application retrieve images, pictures, or long text or binary fields? (DefaultLongDataBuffLen)
If NO, set to 1024 and go to Question 1d.
(Also, if NO, set EnableStaticCursorsForLongData to 1 if Question 4 below is answered yes.)
If YES,
What is the maximum size of images, pictures, or long text or binary fields?
<1 MB (set to 1024 and set OptimizeLongPerformance to 0) (OptimizeLongPerformance is for the client driver only)
<2 MB (set to 2048 and set OptimizeLongPerformance to 0)
<5 MB (set to 5120 and set OptimizeLongPerformance to 0)
<10 MB (set to 10240 and set OptimizeLongPerformance to 0)
>10 MB (set to 25600 and set OptimizeLongPerformance to 0)
and continue to Question 1d.
Question 1d: Does your application issue a fixed set of SQL queries throughout the life of the application (as compared to ad hoc queries) (for example, "select * from emp where ssn=?")? (CachedDescriptionLimit)
If NO, set to 0 and go to Question 2
If Don't Know, go to Question 2, and do not display this connection option in the results.
If YES, Does your application connect and disconnect after each logical unit of work?
If NO, set to 0 and go to Question 2.
If YES, Do the Select statements in your application have potential to be complex (i.e., use subqueries or Unions).
If YES, set to 0 and go to Question 2.
If NO,
How many different Select statements could potentially be executed during the life of the application?
<10 (set to 10)
<50 (set to 50)
<100 (set to 100)
<200 (set to 200)
<300 (set to 300)
>300 (set to 500)
and continue to Question 2.
Question 2: Does your application use PL/SQL procedures (stored procedures)?
If NO, go to Question 2b.
If YES, go to Question 2a.
Question 2a: Can these procedures return results? (ProcedureRetResults)
If NO, set to 0 and go to Question 2b.
If YES, set to 1 and continue to Question 2b.
Question 2b: Do you need to access tables or PL/SQL routines that are grouped in different schemas (as opposed to accessing objects that are contained in a single schema)? (UseCurrentSchema)
If YES, set to 0 and continue to Question 3.
If NO set to 1, go to Question 3.
If Don't Know, go to Question 3 and do not display this connection option in the results.

Question 3: Many applications are server-based and execute SQL statements concurrently (multi-threaded). Is your application multi-threaded?
(ApplicationUsingThreads)
   If NO, set to 0 and continue to Question 4.
   If YES, set to 1 and continue to Question 3a.
   Question 3a: How many concurrent Select statements does your application typically execute? (CachedCursorLimit)
      1-10 (set to 10)
      11-50 (set to 50)
      51-200 (set to 200)
      >200 (set to 400)
      Other (edit field where user can enter an integer value) (set to value entered)
Question 4: Does your application allow the ability to go through the results both forwards and backwards (scrollable results)? (EnableScrollableCursors)
   If YES, set to 1, set EnableStaticCursorsForLongData to 1, and continue to Question 5.
   If NO, set to 0 and continue to Question 5.
Question 5: Sometimes users can attempt to update data that is locked by other users in the system. When this situation occurs, how long do you want the users to wait on the other users to complete their work and free the lock? (LockTimeOut)
   Don't wait (set to 0)
   5 seconds (set to 5)
   10 seconds (set to 10)
   Indefinitely (set to −1) and continue to Question 6.
Question 6: Does your application use the Oracle concept of SYNONYMs?
(CatalogIncludesSynonyms)
   If NO, set to 0 and go to Question 7.
   If Don't Know, go to Question 7 and do not display this connection option in the results.
   If YES, set to 1 go to Question 7.
Question 7: Do you have a batch environment with a low number of users?
(ServerType)
   If YES, set to 2 and go to Question 8.
   If NO,
   Does your Oracle DBMS run on a Windows server?
   If YES, set to 2 and go to Question 8.
   If NO,
   Does your Oracle server have excess processing capacity and memory available when at maximum load?
   If YES, set to 2 and go to Question 8.
   If NO,
   Do you have an application that requires maximum performance at the expense of using more Oracle server resources?
   If YES, set to 2 and go to Question 8.
   If NO, set to 0.
Question 8: Does your application need to see the comments/remarks for database tables? (CatalogOptions)
   If NO, set to 0 and STOP.
   If YES, set to 1 and STOP.
   Example Sybase Question Flow for ODBC Connectivity
   An example Sybase question flow for ODBC connectivity that can be programmed or otherwise configured into the performance tuning wizard, in accordance with an embodiment of the present invention, is a follows (the applicable connection string attribute or property which will be set by the wizard based on how the question or question set is answered, is shown in bold after the initial question):

Question 1: Does your application execute SQL Select statements?
   If NO, go to Question 2.
   If YES, go to Question 1a.
   Question 1a: Does your application often execute a SQL statement before processing or closing the previous result set (use multiple active statements per connection)?
(SelectMethod)
   If NO, set to 1 and go to Question 1c.
   If YES,
   Does your application only allow the ability to scroll forwards through results (forward-only cursors)?
      If YES, set SelectMethod to 0 and go to Question 1b.
      If NO, set SelectMethod to 1 and go to Question 1c (skip Question 1b).
   Question 1b: This set of questions should only be asked if SelectMethod is set to 0.
      How many rows are typically returned when executing Select statements?
(ArraySize)
   1-10 (set to 10)
   11-50 (set to 50)
   51-200 (set to 200)
   Over 200 (set to 500)
   and continue to Question 1c.
   Question 1c: Does your application retrieve images, pictures or long text or binary fields? (DefaultLongDataBuffLen)
      If NO, set to 1024 and go to Question 2.
      If YES,
      What is the maximum size of images, pictures, or long text or binary fields?
         <1 MB (set to 1024)
         <2 MB (set to 2048)
         <5 MB (set to 5120)
         <10 MB (set to 10240)
         >10 MB (set to 51200)
         and continue to Question 2.
Question 2: Does your application execute the same SQL statements multiple times? (OptimizePrepare)
   If YES, set to 1 and continue to Question 3.
   If NO, set to 2 and continue to Question 3.
Question 3: To obtain maximum performance, the TCP-IP network configuration settings of the database and the ODBC driver networking options should be the same. In many cases, database application users are not aware of the network settings. Are you aware of network settings such as the maximum network packet size configured on the database server?
(PacketSize)
   If NO, set to 0 and go to Question 4.
   If YES,
   What is the network packet size of your Sybase ASE Server?
      512b (set to 512)
      2560b (set to 2560)
      5120b (set to 5120)
      10240b (set to 10240)
      Other (edit field where user can enter an integer value up to 10240 in increments of 512) Set to value entered.
   and continue to Question 4.
Question 4: Many applications are server-based and execute SQL statements concurrently (multi-threaded).
   Is your application multi-threaded? (ApplicationUsingThreads)
   If YES, set to 1 and STOP.
   If NO, set to 0 and STOP.

Example Informix WP Question Flow for ODBC Connectivity

An example Informix Wire Protocol (WP) question flow for ODBC connectivity that can be programmed or otherwise configured into the performance tuning wizard, in accordance with an embodiment of the present invention, is a follows (the applicable connection string attribute or property which will be set by the wizard based on how the question or question set is answered, is shown in bold after the initial question):

Question 1: Does your application allow canceling of long running queries?
(CancelDetectInterval)
    If NO, set to 0 and STOP.
    If YES,
        How often do you want the driver to check whether a query has been canceled?
        5 seconds
        10 seconds
        30 seconds
        60 seconds
    Set to value chosen and continue to Question 2.

Question 2: Many applications are server-based and execute SQL statements concurrently (multi-threaded).
    Is your application multi-threaded? (ApplicationUsingThreads)
        If NO, set to 0 and STOP.
        If YES, set to 1 and STOP.

Example DB2 Question Flow for ODBC Connectivity

An example DB2 question flow for ODBC connectivity that can be programmed or otherwise configured into the performance tuning wizard, in accordance with an embodiment of the present invention, is a follows (the applicable connection string attribute or property which will be set by the wizard based on how the question or question set is answered, is shown in bold after the initial question):

Question 1: Do you need to access tables or PL/SQL routines that are grouped in different schemas (as opposed to accessing objects that are contained in a single schema)?
(UseCurrentSchema)
    If YES, set to 0 and go to Question 2.
    If NO, set to 1 and go to Question 2.

Question 2: Many applications are server-based and execute SQL statements concurrently (multi-threaded).
    Is your application multi-threaded? (ApplicationUsingThreads)
        If NO, set to 0 and STOP.
        If YES, set to 1 and STOP.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method using a graphical user interface (GUI) for tuning access middleware that provides an application with one or more connections to a database, the method comprising:
    using a computer to perform steps comprising:
        receiving a first response from a user specifying a type of a driver/provider for the database to be tuned;
        querying the user, based on the first response received from the user, regarding a functionality of the application, the functionality of the application including a functionality to use a prepared statement that is compiled for a connection and available to be executed for the connection, wherein the prepared statement is compiled once for the connection and available to be executed two or more times for the connection;
        receiving a second response from the user specifying the functionality of the application, the second response including data describing that the application uses the prepared statement;
        generating, based on the first response received from the user and the second response including the data describing that the application uses the prepared statement, a set of connection options and values configured to achieve optimal performance of the driver/provider; and
        providing the set of connection options and values to the user.

2. The method of claim 1 wherein providing the set of connection options and values to the user includes at least one of displaying the set of connection options and values, and saving the set of connection options and values into a file.

3. The method of claim 1 comprising:
    querying the user, based on the first and second responses, regarding one or more user preferences associated with application performance;
    receiving a user preference response from the user specifying one or more user preferences; and
    wherein generating the set of connection options and values is further based on the user preference response.

4. The method of claim 1 comprising:
    querying the user regarding personal knowledge of database systems;
    receiving a personal knowledge response regarding the personal knowledge; and
    wherein generating the set of connection options and values is further based on the personal knowledge response.

5. The method of claim 1 comprising:
    adjusting an existing set of connection options and values for an already deployed driver/provider based on the generated set of connection options and values.

6. The method of claim 1 comprising:
    configuring the driver/provider with the generated set of connection options and values.

7. The method of claim 1 comprising indicating progress of the tuning process.

8. The method of claim 1 comprising providing details that indicate an applicable connection string attribute or property based on a question being asked, and guidance on how to set that attribute/property.

9. The method of claim 1 wherein providing the set of connection options and values to the user includes providing multiple output formats from which the user can choose.

10. A computer-readable storage medium encoded with instructions, that when executed by a processor, cause the processor to carry out a process for tuning access middleware that provides an application with one or more connections to a database, the process comprising:
    receiving a first response from a user specifying a type of a driver/provider for the database to be tuned;
    querying the user, based on the first response received from the user, regarding a functionality of the application, the functionality of the application including a functionality to use a prepared statement that is compiled for a connection and available to be executed for the connection, wherein the prepared statement is compiled once for the connection and available to be executed two or more times for the connection;
    receiving a second response from the user specifying the functionality of the application, the second response including data describing that the application uses the prepared statement;

generating, based on the first response received from the user and the second response including data describing that the application uses the prepared statement, a set of connection options and values configured to achieve optimal performance of the driver/provider; and providing the set of connection options and values to the user.

11. The computer-readable storage medium of claim 10 wherein providing the set of connection options and values to the user includes at least one of displaying the set of connection options and values, and saving the set of connection options and values into a file.

12. The computer-readable storage medium of claim 10, the process comprising:
   querying the user, based on the first and second responses, regarding one or more user preferences associated with application performance;
   receiving a user preference response from the user specifying one or more user preferences; and
   wherein generating the set of connection options and values is further based on the user preference response.

13. The computer-readable storage medium of claim 10, the process comprising:
   querying the user regarding personal knowledge of database systems;
   receiving a personal knowledge response regarding the personal knowledge; and
   wherein generating the set of connection options and values is further based on the personal knowledge response.

14. The computer-readable storage medium of claim 10, the process comprising indicating progress of the tuning process.

15. The computer-readable storage medium of claim 10, the process comprising providing details that indicate an applicable connection string attribute or property based on a question being asked, and guidance on how to set that attribute/property.

16. The computer-readable storage medium of claim 10 wherein providing the set of connection options and values to the user includes providing multiple output formats from which the user can choose.

17. A graphical user interface (GUI) system for tuning access middleware that provides an application with one or more connections to a database, the GUI system comprising:
   a processor;
   a module for providing a driver/provider selection screen for receiving a first response from a user specifying a type of a driver/provider for the database to be tuned;
   a module for providing a plurality of navigable application question screens for querying the user based on the first response received from the user and receiving a second response from the user specifying a functionality of the application, the functionality of the application including a functionality to use a prepared statement that is compiled for a connection and available to be executed for the connection, wherein the prepared statement is compiled once for the connection and available to be executed two or more times for the connection;
   a module for generating, based on the first response received from the user and the second response including data describing that the application uses the prepared statement, a set of connection options and values configured to achieve optimal performance of the driver/provider; and
   a module for providing a results screen for providing the set of connection options and values to the user.

18. The system of claim 17 wherein the system allows the user to save the set of connection options and values into a file.

19. The system of claim 17 comprising:
   a module for providing one or more preference question screens based on the first and second responses and receiving a user preference response from the user specifying one or more user preferences, each preference question screen querying the user regarding one or more user preferences associated with application performance; and
   wherein the module for generating the set of connection options and values is configured to generate the set of connection options and values based on the user preference response.

20. The system of claim 17 comprising:
   a module for providing one or more user preference question screens and receiving a personal knowledge response regarding personal knowledge of the user, each user preference question screen querying the user regarding personal knowledge of database systems; and
   wherein the module for generating the set of connection options and values is configured to generate the set of connection options and values based on the personal knowledge response.

21. The system of claim 17 comprising a module for adjusting an existing set of connection options and values for an already deployed driver/provider based on the generated set of connection options and values.

22. The system of claim 17 wherein one or more of the GUI screens indicate progress of the tuning process.

23. The system of claim 17 wherein one or more of the GUI screens provide details that indicate an applicable connection string attribute or property based on a question being asked, and guidance on how to set that attribute/property.

24. The system of claim 17 wherein the results screen for providing the set of connection options and values to the user further allows the user to choose from multiple output formats.

25. The system of claim 17 wherein the system is implemented as a software wizard.

26. A graphical user interface (GUI) system for tuning access middleware that provides an application with one or more connections to a database, the GUI system comprising:
   a processor;
   a means for receiving a first response from a user specifying a type of a driver/provider for the database to be tuned;
   a means for querying the user, based on the first response received from the user, regarding a functionality of an application, the functionality of the application including a functionality to use a prepared statement that is compiled for a connection and available to be executed for the connection, wherein the prepared statement is compiled once for the connection and available to be executed two or more times for the connection;
   a means for receiving a second response from the user specifying the functionality of the application, the second response including data describing that the application uses the prepared statement;
   a means for generating, based on the first response received from the user and the second response including the data describing that the application uses the prepared statement, a set of connection options and values configured to achieve optimal performance of the driver/provider; and
   a means for providing the set of connection options and values to the user.

* * * * *